(12) United States Patent
Duvallet et al.

(10) Patent No.: US 12,503,393 B2
(45) Date of Patent: Dec. 23, 2025

(54) COMPOSITE MINERALIZERS/FLUXES FOR THE PRODUCTION OF ALITE/CALCIUM SULFOALUMINATE CLINKERS

(71) Applicant: University of Kentucky Research Foundation, Lexington, KY (US)

(72) Inventors: Tristana Duvallet, Lexington, KY (US); Thomas Robl, Sadieville, KY (US); Robert Jewell, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 18/208,222

(22) Filed: Jun. 9, 2023

(65) Prior Publication Data

US 2024/0409464 A1 Dec. 12, 2024

Related U.S. Application Data

(62) Division of application No. 17/164,401, filed on Feb. 1, 2021, now abandoned.

(60) Provisional application No. 62/967,625, filed on Jan. 30, 2020.

(51) Int. Cl.
| | |
|---|---|
| *C04B 28/06* | (2006.01) |
| *C04B 7/26* | (2006.01) |
| *C04B 7/32* | (2006.01) |
| *C04B 7/345* | (2006.01) |
| *C04B 7/42* | (2006.01) |
| *C04B 7/44* | (2006.01) |
| *C04B 111/00* | (2006.01) |

(52) U.S. Cl.
CPC .............. *C04B 7/323* (2013.01); *C04B 7/26* (2013.01); *C04B 7/3456* (2013.01); *C04B 7/424* (2013.01); *C04B 7/425* (2013.01); *C04B 7/44* (2013.01); *C04B 28/065* (2013.01); *C04B 2111/00215* (2013.01); *Y02P 40/10* (2015.11)

(58) Field of Classification Search
CPC ....... C04B 28/065; C04B 7/424; C04B 7/425; C04B 7/44; C04B 7/32; C04B 7/345; C04B 28/02; C04B 7/323; C04B 7/26; C04B 7/3456; C04B 2111/00215; Y02P 40/10

See application file for complete search history.

(56) References Cited

U.S. PATENT DOCUMENTS

| | | | |
|---|---|---|---|
| 2013/0152825 A1* | 6/2013 | Ramirez Tovias | C04B 7/421 106/693 |
| 2014/0311386 A1* | 10/2014 | Robl | C04B 7/323 106/693 |

OTHER PUBLICATIONS

Hanein et al. ("Alite calcium sulfoaluminate cement: chemistry and thermodynamics", Advances in Cement Research, pp. 1-12 ( Year: 2018).*
Palomo et al. New alkaline-belitic hybrid binders. 15th International Congress on the Chemistry of Cement (2019) [retrieved on Nov. 24, 2024 at <URL: https://digital.csic.es/handle/10261/211054>] (Year: 2019).*
Duvallet, et al., Study of Alite-Calcium Sulfoaluminate Cement Produced from a High-Alumina Fly Ash; ACI Materials Journal/ Jan. 2022, pp. 1-12.
Duvallet, et al., Novel Composite Mineralizers/Fluxes for the Production of A/CSA Clinkers; 15th International Congress on the Chemistry of Cement Prague, Czech Republic, Sep. 16, 2019, pp. 1-19.
Hanein, et al., Alite calcium sulfoaluminate cement: chemistry and thermodynamics; Advances in Cement Research, 2018; pp. 1-12.
Duvallet, et al., Novel composite mineralizers/fluxes for the production of A/CSA clinkers; 15th International Congress on the Chemistry of Cement Prague, Czech Republic, Sep. 16, 2019, pp. 1-11.

* cited by examiner

*Primary Examiner* — Anthony J Green
*Assistant Examiner* — Marites A Guino-O Uzzle
(74) *Attorney, Agent, or Firm* — Stites & Harbison PLLC; Warren D. Schickli (57) ABSTRACT

A cement clinker composition incorporates calcium fluoride and iron oxide to reduce firing temperatures and increase strength. High fly ash, aluminum dross, aluminum scrap, high aluminum clays and combinations thereof may also be substituted for bauxite in the cement clinker composition.

8 Claims, 4 Drawing Sheets

COMPOSITE MINERALIZERS/FLUXES FOR THE PRODUCTION OF ALITE/CALCIUM SULFOALUMINATE CLINKERS

RELATED APPLICATION

This application is a divisional of U.S. application Ser. No. 17/164,401 filed on Feb. 1, 2021, which claims priority to U.S. Provisional Patent Application Ser. No. 62/967,625 filed on Jan. 30, 2020 which is hereby incorporated by reference in its entirety.

TECHNICAL FIELD

This document generally relates to the cement industry and, more particularly, to an alite/calcium sulfoaluminate (A/CSA) cement clinker incorporating a novel composite of mineralizers/fluxes.

BACKGROUND

The cement industry is the third-largest consumer of industrial energy and the second-largest emitter of industrial carbon dioxide. With the global population growing every year, there is a need for further construction materials in order to meet infrastructure requirements. Ordinary Portland cement (OPC) is the most widely used type of cement material for construction purposes, and it has been estimated that the production of cement is responsible for approximately 7-8% of anthropogenic carbon dioxide emissions worldwide.

The production of OPC requires natural resources as ingredients, such as limestone, marl or chalk as a source of calcium; and clay or shales as a source of silicate and alumina. The raw materials are ground and fired at 1450-1500° C. to obtain the OPC clinker and mixed with 5 wt. % gypsum to obtain the final OPC cement. There are two main processes in cement production responsible for the $CO_2$ emissions. The first source of $CO_2$ emissions is the calcination of limestone, while the second source is the combustion of fossil fuels to produce clinker at high firing temperature. This high firing temperature is necessary for the formation of alite, a high calcium demanding clinker phase, responsible for most of the strength development in OPC cement.

For the past decades, various alternative cementitious binders with lower $CO_2$ emissions than OPC have been proposed. These alternative binders are produced at a lower firing temperature than OPC but do not contain alite and do not perform on a par with it. They include calcium aluminate cements (CAC), belite-calcium sulfoaluminate cement (BCSA), alkali-activated materials (AAM), supersulfated cement, calcium sulfoaluminate belite ferrite cement (CS-ABF), etc. However, these possible alternative solutions encounter issues, ranging from loss of strength over time due to carbonation for CAC, to costly raw materials in CSAB, to highly caustic and costly activators for AAM, and special curing methods (supersulfated and other cements).

The production of a successful commercial alternative binder should be able to seamlessly replace current commercial OPC production methods in cement plants. For example, the same rotary kilns used to produce OPC should be used to produce alternative cements but at a lower firing temperature to reduce the $CO_2$ emissions from the decarbonation of limestone and the fossil fuels. Alternative materials to limestone should be targeted, with emphasis on industrial wastes and by-products. As an example, it has been widespread that CSA cement cannot be widely produced due to the necessity to use bauxite, an abundant but not regionally available material, making it costly. However, the novel cement clinker composition set forth herein demonstrates that an industrial by-product, a high fly ash alumina, may be used as a source of alumina and can completely replace the use of bauxite. Other materials of this type include aluminium dross and scrap as well as high alumina clays such as kaolin.

SUMMARY

In accordance with the purposes and benefits set forth herein, a new and improved cement clinker composition defined by oxide content comprises: 42-65 wt % CaO; 5-20 wt % $SiO_2$; 10-40 wt % $Al_2O_3$; 0.5-5 wt % $Fe_2O_3$; and 2-13 wt % $SO_3$. More specifically, the new and improved clinker composition may comprise: 50-55 wt % CaO; 9-13 wt % $SiO_2$; 20-30 wt % $Al_2O_3$; 0.5-3 wt % $Fe_2O_3$; and 5-10 wt % $SO_3$.

In accordance with yet another aspect, a new and improved cement clinker composition comprises between about 0.1 and 3.0 wt % fluoride compound and between about 0.5 and about 5.0 wt % $Fe_2O_3$. Such a composition may be fired at a temperature of between about 1150-1350° C. More preferably such a cement clinker composition is fired at temperature of between 1200-1300° C. After firing, such a composition provides between about 15 and 40 wt % alite and between about 20 and about 60 wt % calcium sulfoaluminate.

In accordance with an additional aspect, the new and improved cement clinker composition comprises: 15-40 wt % $C_3S$; 20-60 wt % $C_4A_3\bar{S}$; 5-30 wt % $C_2S$; 1-10 wt % $C_4AF$; and 0.4-1.0 wt % $CaF_2$ as present in fluorellestadite and fluormayenite clinker phases fired at 1150-1350° C. and more particularly 1200-1300° C. More specifically, the new and improved cement clinker composition comprises: 20-35 wt % $C_3S$; 40-55 wt % C $C_4A_3\bar{S}$; 10-25 wt % $C_2S$; 1-4 wt % $C_4AF$; and 0.6-0.8 wt % $CaF_2$ as present in fluorellestadite and fluormayenite clinker phases fired at 1150-1350° and more particularly 1200-1300° C.

In the following description, there are shown and described several preferred embodiments of the cement clinker composition. As it should be realized, the cement clinker composition is capable of other, different embodiments and its several details are capable of modification in various, obvious aspects all without departing from the composition as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the cement clinker composition and together with the description serve to explain certain principles thereof.

DETAILED DESCRIPTION

Cement Notation used throughout this document:

| Chemical Formula | Cement Notation |
|---|---|
| CaO | C |
| $SiO_2$ | S |
| $Al_2O_3$ | A |
| $Fe_2O_3$ | F |
| $SO_3$ | $\acute{S}$ |
| M | MgO |

The alternative binder presented in this novel cement clinker composition is alite-calcium sulfoaluminate (A-CSA) cement. A-CSA clinker combines alite ($C_3S$) and calcium sulfoaluminate (CSA, ye'elimite or $C_4A_3\acute{S}$) phases. These are the phases responsible for most of the strength development in OPC and CSA cements, respectively. Until recently, A-CSA clinker was not considered practical due to the perceived incompatible coexistence of both clinker phases. Alite forms at 1450-1500° C., while CSA decomposes at 1300-1350° C. [3-5] The introduction of mineralizers and fluxes, such as calcium fluoride and calcium sulfate [6-13], barium and strontium [14-16], or other elements such as titanium [17], partly resolved this issue, however improvements in this field were needed.

This document demonstrates that the use of both calcium fluoride and iron oxide in the production of A/CSA clinker reduces the melting temperature and increases the formation of alite. Previously, it was found that the presence of sulfate hinder the formation of alite, but as this document demonstrates the production of increased levels of alite (30 wt. %) with high levels of calcium sulfoaluminate (50 wt. %) in the clinker. This binder formulation exhibits superior mechanical properties to both commercial OPC and CSA cement, including higher compressive strength, high resistivity, and high dimensional stability.

The new and improved cement clinker composition as defined by oxide content incorporates about 42-65 wt % CaO; about 5-20 wt % $SiO_2$; about 10-40 wt % $Al_2O_3$; about 0.5-5 wt % $Fe_2O_3$; and about 2-13 wt % $SO_3$. In at least one particularly useful embodiment, the new and improved clinker composition incorporates about 50-55 wt % CaO; about 9-13 wt % $SiO_2$; about 20-30 wt % $Al_2O_3$; about 0.5-3.0 wt % $Fe_2O_3$; and about 5-10 wt % $SO_3$.

In one or more embodiments, the cement clinker composition includes between about 0.1 and about 3.0 wt % fluoride compound and between about 0.5 and about 5.0 wt % $Fe_2O_3$. The fluoride compound may comprise, for example, calcium fluoride ($CaF_2$), pickling liquor sludge containing fluoride and the like.

In one or more embodiments, the cement clinker composition includes between about 10-35 wt % of a bauxite substitute selected from a group consisting of high fly ash alumina, aluminum dross, aluminum scrap, high alumina clays and combinations thereof. For purposes of this document, "high fly ash alumina" means a fly ash containing at least 20 wt. % of $Al_2O_3$, and more preferably at least 40 wt. % of $Al_2O_3$. For purposes of this document, "high alumina clays" means a clay containing at least 10 wt. % of $Al_2O_3$, and more preferably at least 20 wt. % of $Al_2O_3$, such as kaolin compound.

In one or more embodiments, the cement clinker composition incorporates about 15-40 wt % $C_3S$; about 20-60 wt % $C_4A_3\acute{S}$; about 5-30 wt % $C_2S$; about 1-10 wt % $C_4AF$; and about 0.4-1.0 wt % $CaF_2$ as present in fluorellestadite and fluormayenite clinker phases fired at about 1150-1350° C., 1200-1300° C. or 1225-1275° C. More specifically, the new and improved cement clinker composition incorporates about 20-35 wt % $C_3S$; about 40-55 wt % $C_4A_3\acute{S}$; about 10-25 wt % $C_2S$; about 1-4 wt % $C_4AF$; and about 0.6-0.8 wt % $CaF_2$ as present in fluorellestadite and fluormayenite clinker phases fired at about 1150-1350° C. or 1200-1300° C. In one or more embodiments, the cement clinker composition is fired at about 1225-1275° C.

In one or more embodiments, the cement clinker composition further includes between about 0.5-2.0 wt % $Fe_2O_3$. In one or more embodiments, that cement clinker composition also includes between about 10-35 wt % of a bauxite substitute selected from a group consisting of high fly ash alumina, aluminum dross, aluminum scrap, high alumina clays and combinations thereof.

In one or more of the many possible embodiments, the new and improved cement clinker composition comprises between about 0.1 and 3.0 wt % of a fluoride compound, such as $CaF_2$, pickling liquor sludge including fluoride or the like, and between about 0.5 and about 5.0 wt % $Fe_2O_3$. Such a composition may be fired at a temperature of between about 1150-1350° C. or 1200-1300° C. More preferably such a cement clinker composition is fired at temperature of between 1225-1275° C. Further, such a cement clinker composition may include between about 10-35 wt % of a bauxite substitute selected from a group consisting of high fly ash alumina, aluminum dross, aluminum scrap, high alumina clays and combinations thereof.

EXPERIMENTAL SECTION

A calculated clinker composition composed of 50 wt. % alite and 50 wt. % calcium sulfoaluminate was investigated. Four compositions were tested: #1 with no additions of $CaF_2$ or iron oxide; #2 with addition of only $CaF_2$; #3 with addition of only iron oxide; and #4 with additions of both $CaF_2$ and iron oxide. The compositions were produced from reagent chemicals, as presented in Table 1. $Fe_2O_3$ was added at a percentage of 1.3 wt. % to obtain approximately 5 wt. % of ferrite ($C_4AF$) in the final clinker composition. Regarding the addition of $CaF_2$, the target was to produce approximately 10 wt. % of fluorellestadite, a liquid phase. The calculated clinker compositions are presented in Table 2.

TABLE 1

Mixtures of chemicals used to produce A/CSA #1 to A/CSA #4 in weight percentages

| Mixtures | | Reagent Chemicals | | | | | |
|---|---|---|---|---|---|---|---|
| A/CSA | Comments | $Ca(OH)_2$ | $SiO_2$ | $Al(OH)_3$ | $Fe_2O_3$ | $CaSO_4 \cdot 0.5H_2O$ | $CaF_2$ |
| #1 | No fluorellestadite or ferrite | 51.54 | 9.86 | 29.6 | — | 9.0 | — |
| #2 | Only fluorellestadite | 51.235 | 9.815 | 29.4 | — | 8.95 | 0.6 |
| #3 | Only ferrite | 50.89 | 9.21 | 29.6 | 1.3 | 9.0 | — |
| #4 | Both fluorellestadite or ferrite | 50.57 | 9.13 | 29.5 | 1.3 | 8.895 | 0.605 |

TABLE 2

Calculated clinker compositions in wt. % for A/CSA #1 to A/CSA #4

| Mixtures | Calculated Clinker Compositions (in wt. %) | | | | | |
|---|---|---|---|---|---|---|
| | $C_3S$ | $C_2S$ | $C_4A_3\bar{S}$ | $C_4AF$ | $C\bar{S}$ | $CaF_2$ |
| A/CSA #1 | 48.5 | — | 49.9 | — | — | — |
| A/CSA #2 | 48.0 | 0.1 | 49.5 | — | — | 0.78 |
| A/CSA #3 | 45.0 | 0.1 | 47.7 | 5.0 | 0.5 | — |
| A/CSA #4 | 44.7 | — | 47.4 | 5.0 | 0.4 | 0.78 |

A/CSA #1 to A/CSA #4 were produced by mixing the raw materials with the quantities as described in Table 1 with an additional 10 wt. % of deionized water in a mortar and pestle until a homogenized powder was obtained. A part of the powder was kept for SDT analyses. A few 28×7 mm pellets were formed using a load of 25000 lbs, and dried overnight in an oven at 60° C. The pellets were then fired in a box furnace, and followed the firing program: 1—heat from room temperature to 800° C. at 7.5° C./min; 2—dwell at 800° C. for 30 min; 3—heat from 800° C. to 1250° C. at 5.0° C./min; 4—dwell at 1150/1200/1250° C. for 60 min; and 5—quench rapidly in air. The clinker pellets were then crushed in a shatter box until a fine powder was obtained.

Results:
About the a/CSA Clinker
Evidence about the Reduction of the Melting Temperature:

The influence of additions of $CaF_2$ (to form fluorellestadite) and iron oxide (to form ferrite) on A/CSA clinkers was studied through Simultaneous Different Scanning calorimetry and Thermogravimetry Analysis (SDT). The experiments were performed with a TA Instruments SDT Q600, under air atmosphere at a rate of 100 mL/min, from 50° C. to 1400° C., at a heating rate of 10° C./min. The results are presented in FIG. 1.

Figure 1:
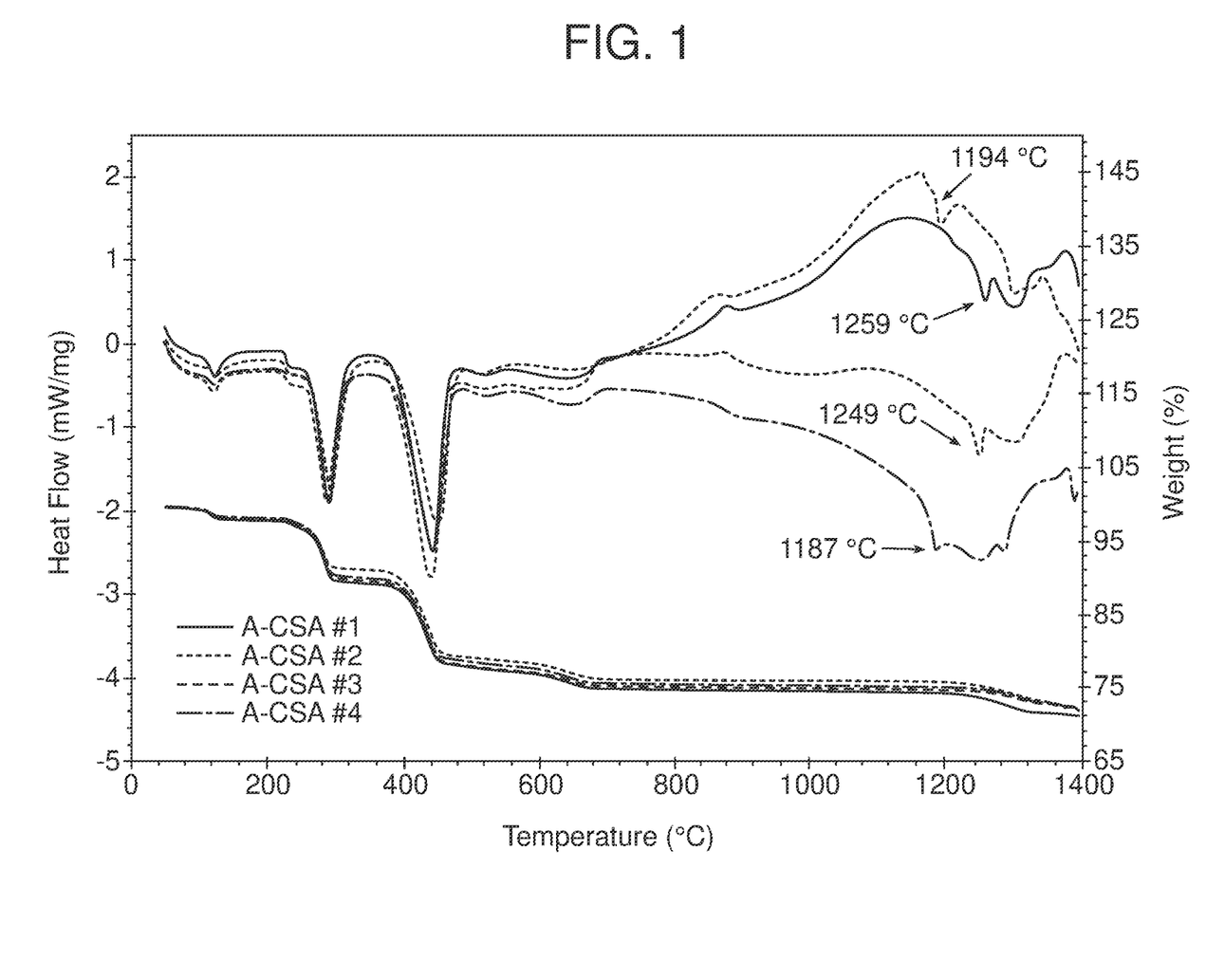
FIG. 1 is graph of DSC/TGA (SDT) data illustrating the influence of fluorellestadite and ferrite within A/CSA clinkers.

Below 600° C., all four A/CSA samples present the same SDT results, where three main peaks are present: at around 100° C. referring to the release of water; at around 300° C. referring to the decomposition of aluminium hydroxide; and at around 450° C. referring to the decomposition of calcium hydroxide. The weight losses for all three peaks are confirmed by the TGA results. The SDT curves of the four A/CSA clinkers differ above 600° C. Compositions A/CSA #1 (no fluorellestadite or ferrite formed) and A/CSA #3 (only ferrite formed) showed melting temperatures at 1259° C. and 1249° C., respectively. The formation of 5 wt. % of ferrite within A/CSA #3 clinker did not considerably decrease the melting temperature of A/CSA clinkers. On the other hand, A/CSA #2 (only fluorellestadite formed) and A/CSA #4 (fluorellestadite and ferrite formed) exhibited lower melting temperatures, at 1194° C. and 1187° C., respectively. Compared to the composition A/CSA #1, the melting temperature decreased by 65° C. when fluorellestadite was formed, and by 72° C. when both fluorellestadite and ferrite were formed. Based on these SDT results, the influence of both fluorellestadite and ferrite within the formation of A/CSA clinkers increased the reduction of the melting temperature.

Evidence about the Formation of High Alite and High Calcium Sulfoaluminate Clinker:

The influence of adding fluorellestadite and ferrite to the raw mix of A/CSA clinkers was determined by XRD/Rietveld analyses. The same compositions as presented in Table 1 and studied through SDT analyses were fired at different temperatures of 1150° C., 1200° C., and 1250° C. for 60 minutes. The results are presented below in Table 3.

TABLE 3

Clinker compositions determined by Rietveld for A/CSA #1 to A/CSA #4 fired at 1150, 1200, and 1250° C. for 60 minutes. Rietveld parameters to ensure accuracy of the results are added: Rexp = Expected R Factor; Rp = Residual of Least-Squares Refinement; Rwp = Weighted Profile R-Factor; and GoF = Goodness of Fit.

| | Clinker phases | | | | | | | | | | | |
|---|---|---|---|---|---|---|---|---|---|---|---|---|
| | A/CSA #1 | | | A/CSA #2 | | | A/CSA #3 | | | A/CSA #4 | | |
| | Firing Temperature (° C.) | | | | | | | | | | | |
| | 1150 | 1200 | 1250 | 1150 | 1200 | 1250 | 1150 | 1200 | 1250 | 1150 | 1200 | 1250 |
| $C_3S$ | 1.1 | 1.3 | — | — | 1.3 | 21.4 | — | — | 3.1 | — | 3.6 | 26.9 |
| $C_2S$ | 40.5 | 39.1 | 39.7 | 38.9 | 38.7 | 21.7 | 35.0 | 37.0 | 36.4 | 35.5 | 33.4 | 14.4 |
| $C_4A_3\bar{S}$ | 36.5 | 47.1 | 47.7 | 43 | 41.8 | 50.4 | 44.8 | 48.2 | 47.7 | 42.3 | 44.3 | 50.5 |
| $C_4AF$ | — | 2.7 | 1.5 | — | 0.6 | — | 3.9 | 4.7 | 4.2 | 4 | 4.4 | 3.2 |

TABLE 3-continued

Clinker compositions determined by Rietveld for A/CSA #1 to A/CSA #4 fired at 1150, 1200, and 1250° C. for 60 minutes. Rietveld parameters to ensure accuracy of the results are added: Rexp = Expected R Factor; Rp = Residual of Least-Squares Refinement; Rwp = Weighted Profile R-Factor; and GoF = Goodness of Fit.

| | Clinker phases | | | | | | | | | | | |
|---|---|---|---|---|---|---|---|---|---|---|---|---|
| | A/CSA #1 | | | A/CSA #2 | | | A/CSA #3 | | | A/CSA #4 | | |
| | Firing Temperature (° C.) | | | | | | | | | | | |
| | 1150 | 1200 | 1250 | 1150 | 1200 | 1250 | 1150 | 1200 | 1250 | 1150 | 1200 | 1250 |
| $C\acute{S}$ | 2.9 | — | — | — | — | 0.1 | — | — | — | — | — | 0.1 |
| C | 11.5 | 7.9 | 10.3 | 10.6 | 9 | 4.6 | 11.1 | 9 | 8.4 | 10 | 6.2 | 2.8 |
| M | 0.2 | 0.4 | 0.7 | 0.4 | 0.3 | 0.1 | 0.4 | 0.4 | 0.3 | 0.4 | 0.6 | 0.2 |
| $C_{12}A_7$ | 5.2 | — | — | — | — | — | — | — | — | — | — | — |
| CA | 2.2 | — | — | — | — | — | — | — | — | — | — | — |
| $C_3A$ | — | — | — | — | — | — | — | — | — | — | — | — |
| $C_{11}A_7CaF_2$ | — | 1.5 | — | 3.8 | 7.2 | 1.5 | 1.3 | 0.7 | — | 5.3 | 6.8 | 1.9 |
| $3C_2S\cdot 3C\acute{S}\cdot CaF_2$ | — | — | — | 3.3 | 1.1 | — | — | — | — | 2.6 | 0.8 | — |
| Rexp | 3.29 | 3.34 | 3.27 | 3.29 | 3.30 | 3.27 | 3.14 | 3.11 | 3.12 | 3.12 | 3.14 | 3.13 |
| Rp | 5.54 | 5.62 | 5.60 | 4.88 | 5.11 | 5.41 | 4.94 | 5.05 | 4.82 | 4.55 | 4.55 | 4.79 |
| Rwp | 8.06 | 8.19 | 8.25 | 7.07 | 7.38 | 7.96 | 7.15 | 7.48 | 7.13 | 6.54 | 6.58 | 6.94 |
| GoF | 6.00 | 6.02 | 6.35 | 4.63 | 5.01 | 5.94 | 5.20 | 5.76 | 5.24 | 4.39 | 4.39 | 4.92 |

The composition A/CSA #1 without the formation of fluorellestadite or ferrite, did not form any measurable alite, at all three firing temperatures. Formation of belite was constant for all three firing temperatures, at around 40 wt. %. The formation of ye'elimite increased with the firing temperature, especially between 1150° C. and 1200° C., from 36.5 to 47.1 wt. %. Instead of forming essentially ye'elimite at 1150° C., other clinker phases were present, such as mayenite (5.2 wt. %), calcium aluminate (2.2 wt. %) and anhydrite (2.9 wt. %). At 1200° C., mayenite, calcium aluminate, and anhydrite were no longer present, while more ye'elimite had been formed. The free lime content decreased with the increasing firing temperature, from 11.5, to 7.9, and 10.3 wt. %, at 1150, 1200, and 1250° C.

The composition A/CSA #2 (only $CaF_2$ added) contained a significant amount of alite when fired at 1250° C., at 21.4 wt. %, and 4.6 wt. % of free lime. At lower firing temperatures, mostly belite and ye'elimite were present, with free lime, $C_{11}A_7CaF_2$, and fluorellestadite. As studied previously in other works, the addition of calcium fluoride does provide benefit in reducing the firing temperature by forming a liquid phase, fluorellestadite, at a low temperature. Fluorellestadite does contribute to the formation of alite at a low firing temperature of 1250° C.

The composition A/CSA #3 (only iron oxide added) contained a small amount of alite (3.1 wt. %), only at 1250° C. As expected, belite and ye'elimite are the major clinker phases present and ferrite is present at around 4.0-4.5 wt. % at all three firing temperatures. In addition, the free lime content does not seem to decrease significantly, even at high firing temperature of 1250° C., with a content of 8.4 wt. %. In OPC, the clinker ferrite is known to form a liquid phase promoting the formation of alite via a flux mechanism. Recent work by Lu et al. discusses the influence of ferrite on the formation and coexistence of ye'elimite and alite. They demonstrated that the addition of 20 wt. % of ferrite within an A/CSA clinker (from calculation: 15 wt. % $C_3S$, 42 wt. % $C_2S$, 23 wt. % $C_4A_3\acute{S}$, and 20 wt. % $C_4AF$) facilitated the coexistence of both phases at 1350° C. A/CSA #3 clinker confirms their results, that the addition of a small amount of ferrite, here 5 wt. %, does contribute to the formation of alite in small quantity.

The final composition, A/CSA #4 ($CaF_2$ and iron oxide added), contained a significant amount of alite and ye'elimite, of 26.9 wt. % and 50.5 wt. % respectively, and a low amount of free lime, (2.8 wt. %), when fired at 1250° C. At low firing temperatures of 1150° C. and 1200° C., almost no alite was present, and only belite, ye'elimite and free lime. Even though this composition, when fired at 1250° C., still contains free lime at a level above our target of 2.0%, it proves that the addition of both fluorellestadite and ferrite in combination improves the clinkering process by decreasing the firing temperature needed to form A/CSA clinkers and forming a significant amount of alite and ye'elimite.

As mentioned earlier, other works have demonstrated the production of A/CSA clinkers, but with much lower quantities of alite. As a few examples, Londono-Zuluaga et al. produced a A/CSA clinker with 60 wt. % belite, 14 wt. % ye'elimite, and 10 wt. % alite, by adding 0.9 wt. % $CaF_2$ to the raw mixture, and sintering at 1300° C. for 15 minutes. In another work by Ma et al., they demonstrated a two stage process for the production of a A/CSA clinker based on a OPC clinker, containing in the final clinker less than 4 wt. % ye'elimite, when fired at 1250° C.

While first interpreting the SDT data, it did not seem that the formation of both fluorellestadite and ferrite together within A/CSA clinker effectively improved the reduction in the firing temperature, when compared with only the addition of fluorellestadite as only a 7° C. difference in temperature was observed between A/CSA #2 and A/CSA #4. However, when interpreting the Rietveld data, the results unequivocally demonstrated that presence of both phases successfully enhanced the formation of alite, reduced the firing temperature, and free lime content.

Experiments were run again at 1250° C. and this time, the difference of adding only $CaF_2$ and adding both $CaF_2$ and iron oxide was obvious, as presented in Table 4.

TABLE 4

Calculated clinker compositions in wt. % for A/CSA #1 to A/CSA #4 by following the equations of established by Dr. Zhou [23]. Clinker compositions of samples presented in Tables 1 and 2, characterized by Rietveld method. (Fl* = fluorellestadite)

|  |  | A-CSA #1 | A-CSA #2 | A-CSA #3 | A-CSA #4 |
|---|---|---|---|---|---|
| Expected/Calculated Compositions | $C_3S$ | 48.5 | 48.0 | 45 | 44.7 |
|  | $C_2S$ | 0 | 0.1 | 0.1 | 0 |
|  | $C_4A_3\bar{S}$ | 49.9 | 49.5 | 47.7 | 47.4 |
|  | $C_4AF$ | 0 | 0 | 5.0 | 5.0 |
|  | $C\bar{S}$ | 0 | 0 | 0.5 | 0.4 |
| Mineralizers/Fluxes present |  | None | Fl* | Ferrite | Fl* & Ferrite |
| Rietveld Compositions | $C_3S$ | 0.4 | 13.4 | 4.0 | 24.5 |
|  | $C_2S$ | 45.6 | 33.1 | 42.6 | 22.6 |
|  | $C_4A_3\bar{S}$ | 40.5 | 42.6 | 39.3 | 42.8 |
|  | $C_4AF$ | 0.9 | 0.6 | 4.6 | 3.7 |
|  | $C\bar{S}$ | 0.1 | 0.0 | 0.2 | 0.1 |
|  | C | 8.4 | 5.6 | 7.2 | 2.8 |
|  | M | 0.2 | 0.1 | 0.2 | — |
|  | $C_{12}A_7$ | 0.1 | — | 0.5 | 2.8 |
|  | CA | 1.9 | — | — | — |
|  | $C_{11}A_7CaF_2$ | 1.8 | — | 1.4 | 0.5 |
|  | Fl* | — | 4.5 | — | — | about the A/CSA Cement

An A/CSA clinker was produced from 55.7 wt. % of agricultural lime, 12.3 wt. % of FGD gypsum, 31.38 wt. % of high alumina ash, and 0.62 wt. % of calcium fluoride. In terms of oxide contents within the raw mix, the composition is: 52.6 wt. % CaO, 11.5 wt. % $SiO_2$, 25.3 wt. % $Al_2O_3$, 1.3 wt. % $Fe_2O_3$, and 7.5 wt. % $SO_3$, and minor compounds. The raw materials used can be easily replaced with current raw materials, such as limestone, marl/clay, bauxite, aluminium dross, and pickling liquor sludge. Other raw materials can also be introduced, as long as the oxide content of the final clinker is similar to the composition described above. Similar A/CSA clinker compositions with various available raw materials are presented in Table 5. The raw materials were milled together and fired at 1250° C. for 60 minutes, and ground to a particle size d(50) of around 13-14 µm. The final clinker was analysed by XRD/Rietveld and contained: 29.6 wt. % alite ($C_3S$), 9.4 wt. % belite ($C_2S$), 1.5 wt. % ferrite ($C_4AF$), 50.8 wt. % ye'elimite ($C_4A_3\bar{S}$), 0.6 wt. % anhydrite ($C\bar{S}$), and 0.3 wt. % free lime. The other clinker phases are minor phases.

TABLE 5

Possible alternative raw materials for the production of A/CSA clinkers (not limiting in scope)

| Raw Materials in wt. % | Exemplary Embodiment-A/CSA | Alternative #1 | Alternative #2 |
|---|---|---|---|
| Agriculture Lime | 55.7 | — | — |
| FGD Gypsum | 12.3 | 9 | 9 |
| $CaF_2$ | 0.62 | — | — |
| High alumina Ash | 31.38 | — | — |
| Aluminum Dross | — | — | 20 |
| Limestone | — | 62 | 62 |
| Bauxite | — | 21.5 | — |
| Pickle liquor sludge | — | 1.5 | 1.5 |
| Marl/Clay | — | 6 | 7.5 |

Mechanical properties of A/CSA cements were tested alongside two commercial cements, an OPC Type I from Cemex and a CSA cement from Buzzi. The composition of the A/CSA cements with gypsum (CSA-NM-20G) and anhydrite (CSA-NM-15.8A) are presented in Table 6.

TABLE 6

Compositions of mortar samples in grams

| Materials | OPC | CSA | CSA-NM-20G | CSA-NM-15.8A |
|---|---|---|---|---|
| OPC Type I (Cemex) | 450 | — | — | — |
| CSA Cement (Buzzi) | — | 450 | — | — |
| A/CSA clinker | — | — | 360 | 378.9 |
| FGD Gypsum | — | — | 90 | — |
| Anhydrite | — | — | — | 71.1 |
| Sodium Citrate | — | 4.5 | 4.5 | 4.5 |
| European Sand (EN-196) | 1350 | 1350 | 1350 | 1350 |
| DI Water | 225 | 225 | 225 | 225 |

European standard EN 196 was followed to produce mortar samples for compressive strength, resistivity, and dimensional stability measurements. Following the production of mortar samples, the samples were stored in a 100% humidity chamber, demolded after 24 hours, and tested after 1, 7, 14, 21, 28, 56, and 91 day. At each test day, the samples were tested for resistivity with the Resipod from Proceq, for dimensional stability by measuring the length, and for compressive strength.

Figure 2:
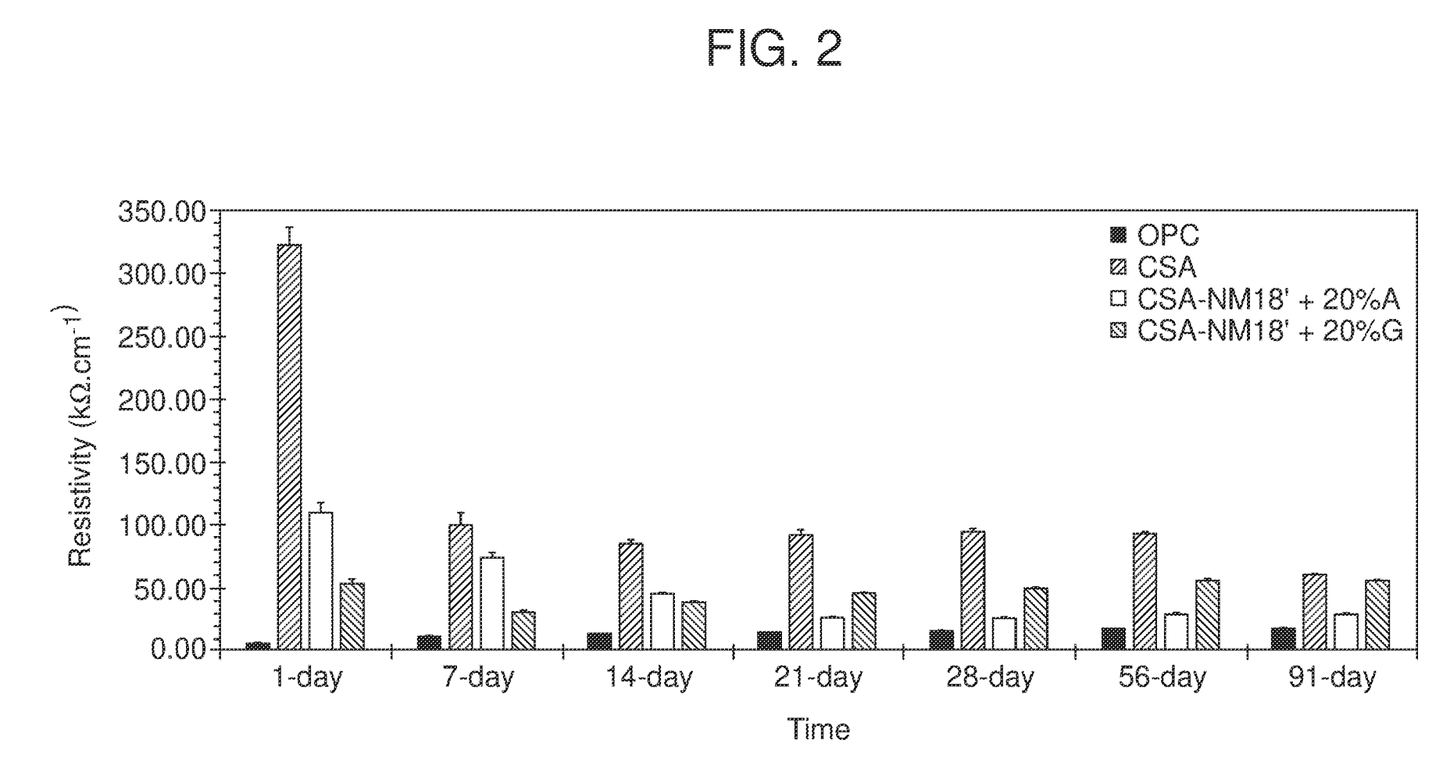
FIG. 2 is a bar graph of resistivity as a function of time for cement made with the new and improved clinker composition compared to commercial cements.

Evidence about the High Resistivity of A/CSA Cement Compared to Commercial Cements:

The resistivity data (see FIG. 2) demonstrate that the A/CSA cement exhibits much higher resistivity compared to OPC cement at all ages. Compared to CSA cement, A/CSA cement is lower initially but increases to a similar level at 91 days. Resistivity is relatable to the level of interconnected pores and in a measure of durability.

Figure 3:
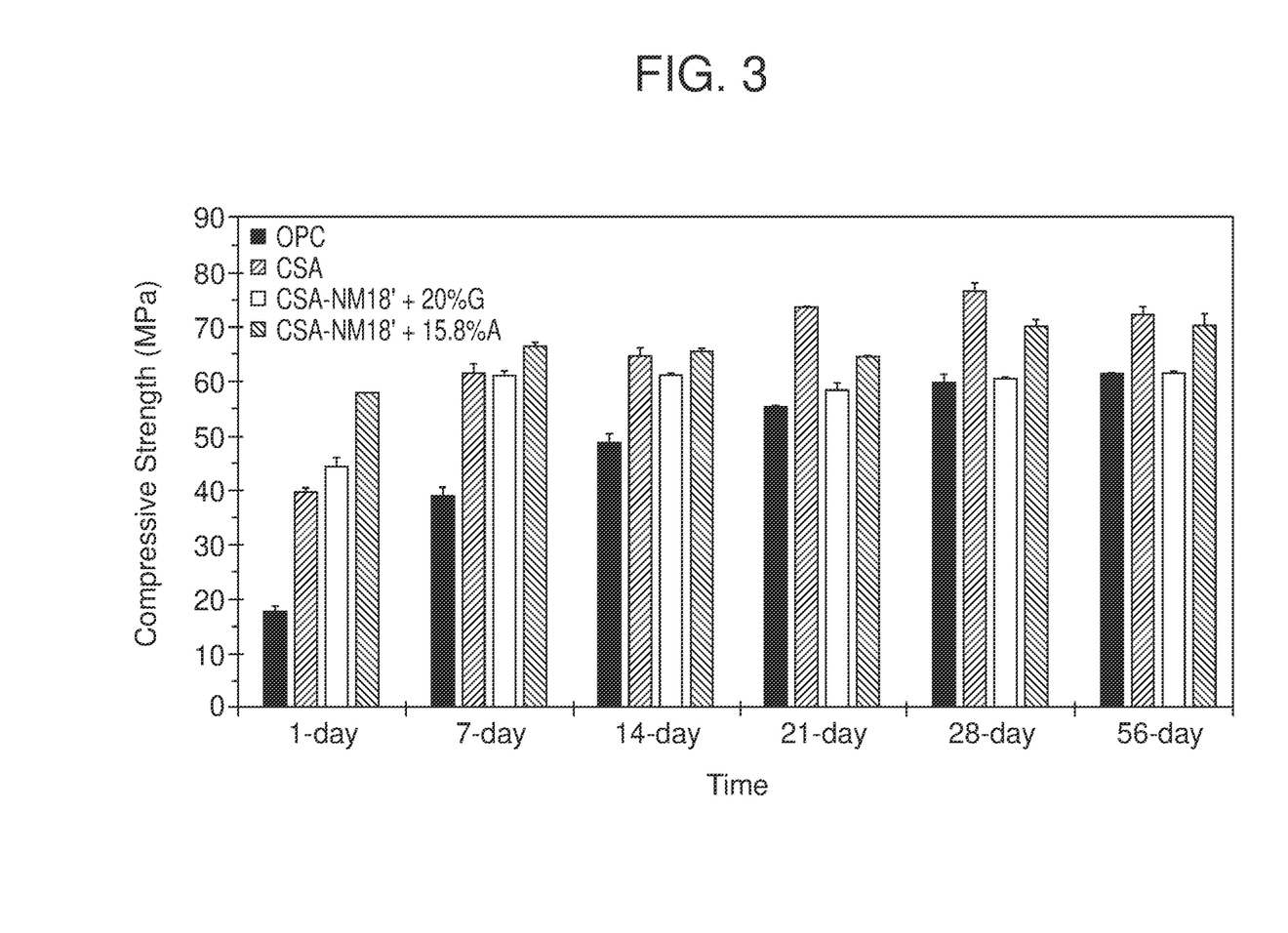
FIG. 3 is a bar graph of compressive strength as a function of time for cement made with the new and improved clinker composition compared to commercial cements.

Evidence about the High Compressive Strength A/CSA Cement Compared to Commercial Cements:

The compressive strength data (see FIG. 3) demonstrate that after one day the new and improved A/CSA cement is 2-3 times stronger than OPC and 145% stronger than CSA with A/CSA with anhydrite. For the first 14 days, A/CSA with anhydrite is the strongest.

Figure 4:
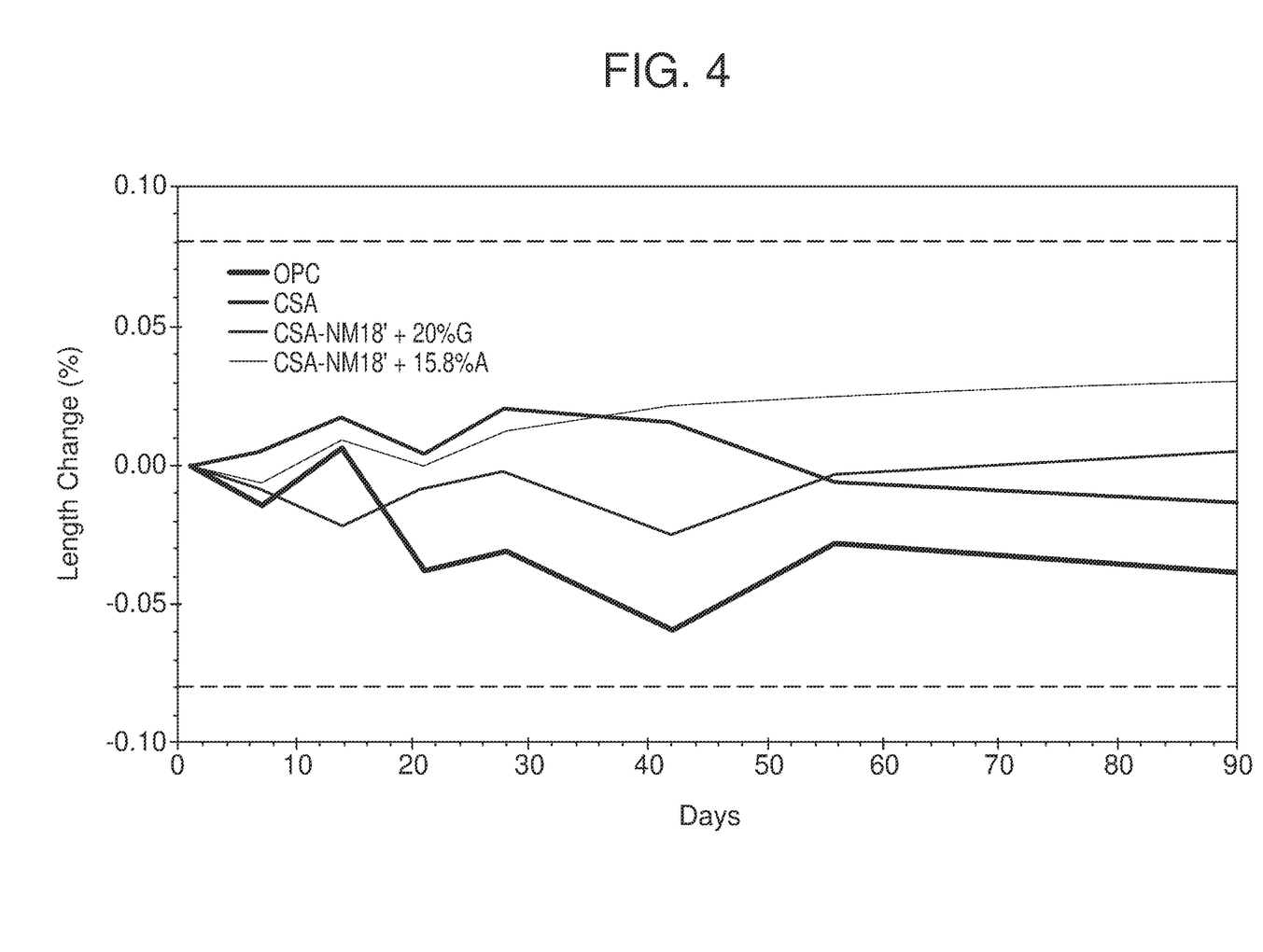
FIG. 4 is a line graph of length change as a function of time for cement made with the new and improved clinker composition compared to commercial cements.

Evidence about the High Stability in High Humidity Curing Room of a/CSA Cement Compared to Commercial Cements:

The mortar samples were stable compared to the commercial cements meeting all requirements, with expansion and/or shrinkage of less than 0.08%, as can be seen from FIG. 4.

The Following Methods are Also Provided.

Bullet List of the Method Steps for the Production of Clinker:
1. Select the raw materials that satisfies the chemical composition described in the following claims, especially the amounts of iron oxide and calcium fluoride;
2. For our exemplary embodiment-A/CSA, mix 55.7 wt. % agricultural lime, 12.3 wt. % FGD gypsum, 31.38 wt. % of high alumina ash (includes sufficient iron oxide), and 0.62 wt. % calcium fluoride;
3. Produce pellets by mixing raw mix with 10 wt. % of deionized water in a mortar and pestle until complete homogenization is obtained and pressing the raw mix using a 25000 lbs load;
4. Dry the pellets in an oven at 60° C. overnight;
5. Fire the pellets in a box furnace following the firing procedure: 1—ramp from room temperature to 800° C. at 7.5 C/min; 2—dwell for 30 min at 800° C.; 3—ramp from 800° C. to 1250° C. at 5 C/min; 4—dwell at 1250° C. for 60 min; 5—rapid quenching of the pellets;
6. Grind the pellets in a shatter box or ball mill until a particle size d(50) of around 5-15 μm is obtained, and preferably around 8-12 μm.
7. Verify the clinker composition by XRD/Rietveld analyses.

Bullet List of the Method Steps for the Production of Cement:
1. Mix the A/CSA clinker with 20 wt. % FGD gypsum or 15.8 wt. % anhydrite until complete homogenization is obtained;
2. Follow EN-196 for the production and testing of mortar samples.

Each of the following terms written in singular grammatical form: "a", "an", and the ", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase "consisting essentially of". Each of the phrases "consisting of and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to +10% of the stated numerical value. Use of the terms parallel or perpendicular are meant to mean approximately meeting this condition, unless otherwise specified.

It is to be fully understood that certain aspects, characteristics, and features, of the cement clinker composition and method of making the same, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the cement clinker composition and method of making the same which are illustratively described and presented in combination or sub-combination in the context or format of a single embodiment may also be illustratively described and presented in the context or format of a plurality of separate embodiments.

Although the cement clinker composition and method of making the same have been illustratively described and presented by way of specific exemplary embodiments, and examples thereof, it is evident that many alternatives, modifications, or/and variations, thereof, will be apparent to those skilled in the art. The cement clinker compositions described above and in the following claims may also be accurately expressed as "consisting of" rather than "comprising" the formulations indicated in the body of the following claims. Accordingly, it is intended that all such alternatives, modifications, or/and variations, fall within the spirit of, and are encompassed by, the broad scope of the appended claims.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A cement clinker composition, comprising:
   20-35 wt % $C_3S$;
   40-55 wt % $C_4A_3\bar{S}$;
   10-25 wt % $C_2S$;
   2-6 wt % $C_4AF$; and
   0.7-0.85 wt % $CaF_2$ as present in fluorellestadite and fluormayenite clinker phases fired at 1200-1300° C.

2. The cement clinker of claim 1, further including between about 0.5-5 wt % $Fe_2O_3$.

3. The cement clinker of claim 2, further including between about 10-35 wt % of a bauxite substitute selected from a group consisting of high fly ash alumina, aluminum dross, aluminum scrap, high alumina clays and combinations thereof.

4. The cement clinker of claim 1, further including between about 10-35 wt % of a bauxite substitute selected from a group consisting of high fly ash alumina, aluminum dross, aluminum scrap, high alumina clays and combinations thereof.

5. The cement clinker composition of claim 1, including:
   1-4 wt % $C_4AF$.

6. The cement clinker of claim 5, further including between about 10-35 wt % of a bauxite substitute selected from a group consisting of high fly ash alumina, aluminum dross, aluminum scrap, high alumina clays and combinations thereof.

7. A cement clinker composition, comprising between about 0.7 and about 0.85 wt % $CaF_2$ and between about 0.5 and about 5.0 wt % $Fe_2O_3$ and after firing at between about 1200° C. and 1300° C. including between about 20 and about 35 wt % alite and between about 40 and about 55 wt % calcium sulfoaluminate.

8. The cement clinker of claim 7, further including between about 10-35 wt % of a bauxite substitute selected from a group consisting of high fly ash alumina, aluminum dross, aluminum scrap, high alumina clays, kaolin, metakaolin, 1:1 silica to alumina clays and combinations thereof.

* * * * *